(12) United States Patent
Hall et al.

(10) Patent No.: US 7,301,429 B1
(45) Date of Patent: Nov. 27, 2007

(54) MULTIPLE FREQUENCY INDUCTIVE RESISTIVITY DEVICE

(76) Inventors: David R. Hall, 2185 S. Larsen Pkwy., Provo, UT (US) 84606; Paula Turner, 2185 S. Larsen Pkwy., Provo, UT (US) 84606; Jim Shumway, 2185 S. Larsen Pkwy., Provo, UT (US) 84606; Tyson J. Wilde, 2185 S. Larsen Pkwy., Provo, UT (US) 84606; Jad A. Mills, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/687,891

(22) Filed: Mar. 19, 2007

Related U.S. Application Data

(63) Continuation-in-part of application No. 11/676,494, filed on Feb. 19, 2007, now Pat. No. 7,265,649.

(51) Int. Cl.
*H01F 27/29* (2006.01)

(52) U.S. Cl. .......................... 336/192; 336/90; 324/339

(58) Field of Classification Search ................. 336/65, 336/90–92, 192, 198; 324/333–343; 340/853.1
See application file for complete search history.

(56) References Cited

U.S. PATENT DOCUMENTS

| | | | |
|---|---|---|---|
| 4,278,556 A | 7/1981 | Tada | |
| 4,302,722 A * | 11/1981 | Gianzero | 324/339 |
| 4,536,714 A | 8/1985 | Clark | |
| 4,766,384 A | 8/1988 | Kleinberg | |
| 4,808,929 A * | 2/1989 | Oldigs | 324/339 |
| 4,839,644 A * | 6/1989 | Safinya et al. | 340/854.3 |
| 4,881,988 A | 11/1989 | Bonser | |
| 5,138,263 A | 8/1992 | Towle | |
| 5,491,488 A | 2/1996 | Wu | |
| 5,530,358 A | 6/1996 | Wisler | |
| 6,114,972 A | 9/2000 | Smith | |
| 6,191,586 B1 | 2/2001 | Bittar | |
| 6,218,842 B1 | 4/2001 | Bittar et al. | |
| 6,259,030 B1 | 7/2001 | Tanigawa et al. | |
| 6,297,639 B1 | 10/2001 | Clark | |
| 6,344,746 B1 | 2/2002 | Chunduru et al. | |
| 6,359,438 B1 | 3/2002 | Bittar | |
| 6,538,447 B2 | 3/2003 | Bittar | |
| 6,577,129 B1 | 6/2003 | Thompson et al. | |
| 6,630,831 B2 | 10/2003 | Amini | |
| 6,646,441 B2 | 11/2003 | Thompson et al. | |
| 6,677,756 B2 | 1/2004 | Fanini et al. | |
| 6,703,837 B1 | 3/2004 | Wisler et al. | |
| 6,765,385 B2 | 7/2004 | Sinclair et al. | |
| 6,768,700 B2 * | 7/2004 | Veneruso et al. | 367/81 |

(Continued)

*Primary Examiner*—Tuyen T. Nguyen
(74) *Attorney, Agent, or Firm*—Tyson J. Wilde

(57) ABSTRACT

In one aspect of the present invention, an induction resistivity tool incorporated into a downhole tool string component comprises an annular radial recess disposed along an outside surface of a tubular wall of the downhole component. At least one electrically insulated induction coil is disposed in the radial recess and adapted to transceive induction signals outward from the tubular wall when carrying an electrical current. The at least one coil is tuned for an optimal signal frequency and an actuator in the downhole component is adapted to put an electrically conductive element into and out of electrical contact with the at least one coil and thereby change the optimal signal frequency.

20 Claims, 8 Drawing Sheets

U.S. PATENT DOCUMENTS

| | | |
|---|---|---|
| 6,777,940 B2 | 8/2004 | Macune |
| 6,810,331 B2 | 10/2004 | Bittar et al. |
| 6,814,162 B2 | 11/2004 | Moran et al. |
| 6,849,195 B2 | 2/2005 | Basheer et al. |
| 6,900,640 B2 | 5/2005 | Fanini |
| 6,913,095 B2 | 7/2005 | Krueger et al. |
| 6,915,701 B1 | 7/2005 | Tarler |
| 7,031,839 B2 | 4/2006 | Tabarovsky et al. |
| 7,040,003 B2 | 5/2006 | Hall et al. |
| 7,064,676 B2 | 6/2006 | Hall et al. |
| 7,091,810 B2 | 8/2006 | Hall et al. |
| 7,095,232 B2 * | 8/2006 | Haber et al. ................ 324/368 |
| 7,116,199 B2 | 10/2006 | Hall et al. |
| 2004/0113626 A1 | 6/2004 | Wang et al. |
| 2006/0158296 A1 | 7/2006 | Hall |
| 2006/0197629 A1 | 9/2006 | Pivit et al. |
| 2006/0208383 A1 | 9/2006 | Aisenbrey |

* cited by examiner

MULTIPLE FREQUENCY INDUCTIVE RESISTIVITY DEVICE

CROSS REFERENCE TO RELATED APPLICATIONS

This application is a continuation-in-part of U.S. patent application Ser. No. 11/676,494 filed on Feb. 19, 2007 now U.S. Pat. No. 7,265,649 and entitled Flexible Inductive Resistivity Device. U.S. patent application Ser. No. 11/676,494 is herein incorporated by reference for all that it contains.

BACKGROUND OF THE INVENTION

The present invention relates to the field of downhole oil, gas, and/or geothermal exploration and more particularly to the field of resistivity tools for tool strings employed in such exploration.

For the past several decades, engineers have worked to develop apparatus and methods to effectively obtain information about downhole formations, especially during the process of drilling. Logging-while-drilling (LWD) refers to a set of processes commonly used by the industry to obtain information about a formation during the drilling process in order to transmit the information from components located downhole on oil and gas drilling strings to the ground's surface. Various sensors and methods have been developed to obtain and transfer formation information to the surface.

Another problem the industry has sought to address has been invasion of the formation by drilling mud. As drilling mud invades the surrounding formation, the resistivity of the drilling mud may mask the resistivity of the native formation. Varying combinations of transmitter-receiver distances have been used in order to explore formations at various depths of investigation, some utilizing multiple signal frequencies.

The prior art contains references to resistivity tools and resistivity logging.

U.S. Pat. No. 6,677,756 to Fanini, et al, which is incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,359,438 to Bittar, which is incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

U.S. Pat. No. 6,577,129 to Thompson, et al, which is incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is incorporated by reference for all that it contains, discloses a multi-mode resistivity tool for use in a logging-while-drilling system that includes an asymmetric transmitter design with multiple transmitters capable of generating electromagnetic signals at multiple depths of investigation.

U.S. Pat. No. 7,141,981 to Folbert, et al, which is incorporated by reference for all that it contains, discloses a resistivity logging tool suitable for downhole use that includes a transmitter, and two spaced apart receivers. The resistivities at the two receivers are corrected based on measuring the responses of the receivers to a calibration signal.

U.S. Pat. No. 6,218,842 to Bittar, et al, which is incorporated by reference for all that it contains, discloses a resistivity tool for use in LWD systems that includes an asymmetric transmitter design with multiple transmitters capable of generating EM signals at multiple frequencies.

U.S. Pat. No. 6,810,331 to Bittar, et al, which is incorporated by reference for all that it contains, discloses a system and related method for obtaining electromagnetic resistivity logs of a formation having fixed depths of investigation that differ from the actual depth of investigation for the tool.

U.S. Pat. No. 6,777,940 to Macune, which is incorporated by reference for all that it contains, discloses a well logging apparatus and methods for determining formation resistivity at multiple (>3) depth of investigation. At least one transmitter antenna and at least two receiver antennas are mounted in a logging tool housing, on substantially a common axis. The antennas are untuned coils of wire. The apparatus minimizes the number of antennas, electronics, complexity, required power, and measurement time required to determine resistivity at multiple depth of investigation.

BRIEF SUMMARY OF THE INVENTION

In one aspect of the present invention, an induction resistivity tool incorporated into a downhole tool string component comprises an annular radial recess disposed along an outside surface of a tubular wall of the downhole component. At least one electrically insulated induction coil is disposed in the radial recess and adapted to transceive induction signals outward from the tubular wall when carrying an electrical current. The at least one coil is tuned for an optimal signal frequency and an actuator in the downhole component is adapted to put an electrically conductive element into and out of electrical contact with the at least one coil and thereby change the optimal signal frequency of the coil. The electrically conductive element may be a coil tap. In other embodiments it may comprise at least one electrically conductive wire, electrically conductive stub, capacitor, inductor, resister, transformer, varicap diode, or combinations thereof.

The actuator may comprise at least one solid state switch, rely, spring, solenoid, transistor, capacitor, varicap diode, inductor, resister, bypass capacitor, decoupling capacitor, multiplexer, or combinations thereof. The actuator may comprise a switch selected from the group consisting of physical switches, electrical switches, toggle switches, rocker switches, biased switches, trembler switches, pneumatic switches, reed switches, microswitches, centrifugal switches, Hall effect switches, and combinations thereof. In some embodiments of the invention a plurality of actuators may be disposed along the coil and each actuator may be adapted to selectively electrically connect and disconnect an electrically conductive element with the coil. At least two different electrically conductive elements may be actuated by the same actuator in some embodiments.

The electrical contact of the electrically conductive element with the coil may change a potential electromagnetic circuit path through the coil, thereby altering the optimal signal frequency of the coil. The optimal signal frequency of the coil may be adjusted by altering a number of coil turns carrying electrical current.

In some embodiments of the invention a flexible ring of magnetically conducting material may be disposed intermediate the coil and a surface of the radial recess. It may be arranged within the radial recess such that it filters a range of frequencies of the induction signals. The coil may comprise any where from 1 to 3,000 turns of coil, but in a preferred embodiment it comprises between 1 and 15 turns. The coil may comprise an electrically insulating coating. The electrically insulating coating may comprise one or more openings adapted to allow electrical contact between the coil and the electrically conductive element. In some embodiments of the present invention the coil may comprise two sets of coil turns, each set adapted to be selectively energized. The resistivity tool may be in communication with a downhole network.

In another aspect of the invention, an induction resistivity tool incorporated into a downhole tool string component comprises a plurality of annular radial recesses disposed along an outside surface of a tubular wall of the downhole component. A least one electrically insulated induction coil is disposed in each radial recess and adapted to transceive induction signals when carrying an electrical current. Each at least one coil is tuned for an optimal signal frequency, and an actuator in the downhole component is adapted to move an electrically conductive element into and out of electrical contact with each at least one coil and thereby change their optimal signal frequency. A plurality of the at least one coils in the same radial recess or in a plurality of radial recesses may be each selectively energized. In some embodiments a plurality of the at least one coil in the plurality of radial recesses may each be selectively operated at multiple frequencies and adapted to obtain resistivity data from multiple depths of the formation. At least two of the at least one coils may be tuned to the same optimal signal frequency. In some embodiments a control signal sent from a control module to the plurality of radial recesses may trigger an actuator, resulting in changing the optimal signal frequency for at least two coils.

DETAILED DESCRIPTION OF THE INVENTION AND THE PREFERRED EMBODIMENT

Figure 1:
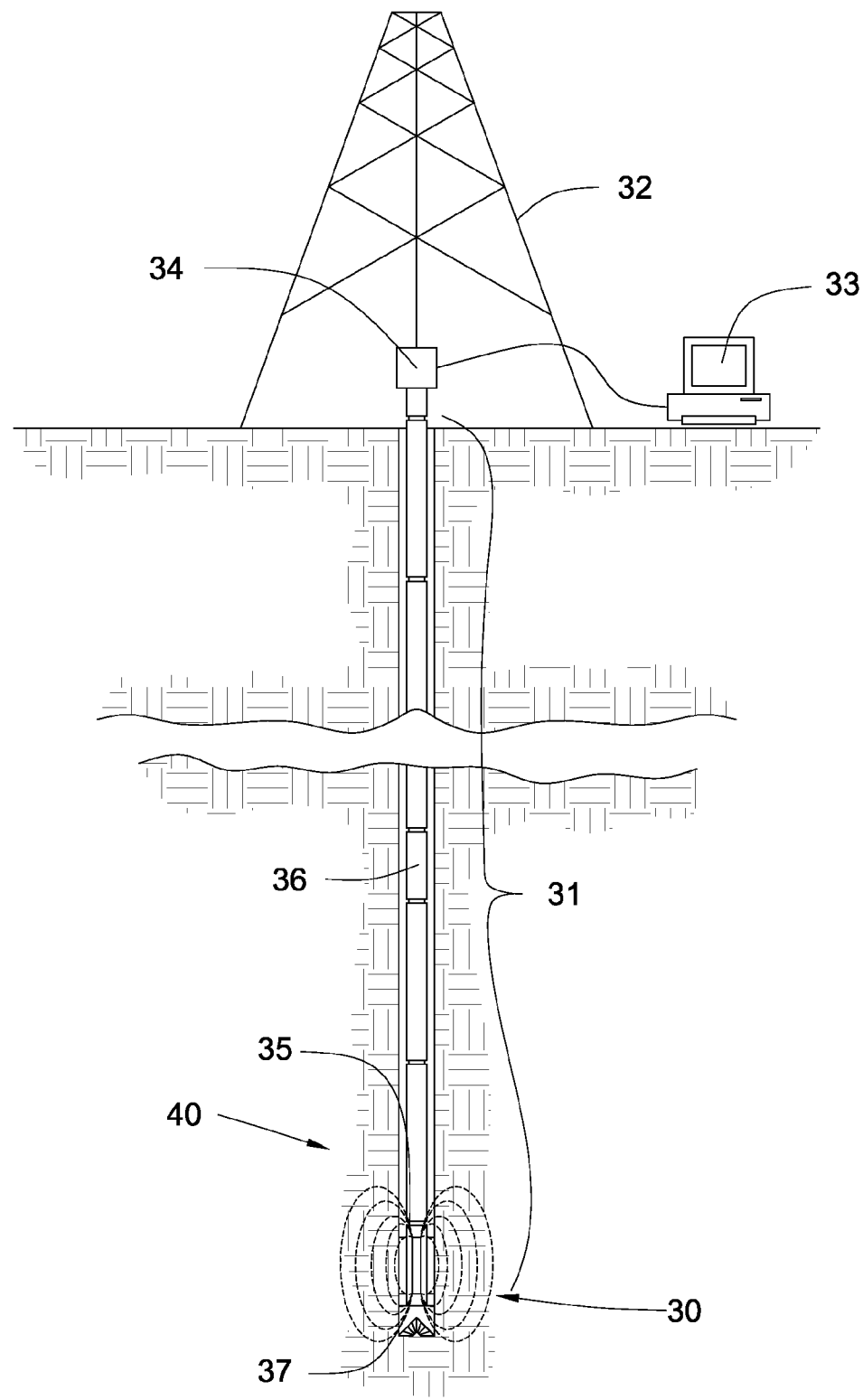
FIG. 1 is a cross-sectional diagram of an embodiment of a downhole tool string.

Referring now to FIG. 1, a downhole tool string 31 may be suspended by a derrick 32. The tool string may comprise one or more downhole components 36, linked together in a tool string 31 and in communication with surface equipment 33 through a downhole network. Having a network in the tool string 31 may enable high-speed communication between each device connected to it and facilitate the transmission and receipt of data between sensors, energy sources, and energy receivers.

The tool string 31 or surface equipment 33 may comprise an energy source or multiple energy sources. The energy source may transmit electrical current to one or more downhole components 36 on the bottom hole assembly 37 or along the tool string 31. In some embodiments of the invention, one or more downhole component 36 may comprise sensors. These sensors may sense gamma rays, radioactive energy, resistivity, torque, pressure, or other drilling dynamics measurements or combinations thereof from the formation being drilled. Any combination of downhole components 36 in a tool string 31 may be compatible with the present invention.

Data may be transmitted along the tool string 31 through techniques known in the art. A preferred method of downhole data transmission using inductive couplers disposed in tool joints is disclosed in the U.S. Pat. No. 6,670,880 to Hall, et al, which is herein incorporated by reference for all it discloses. An alternate data transmission path may comprise direct electrical contacts in tool joints such as in the system disclosed in U.S. Pat. No. 6,688,396 to Floerke, et al., which is herein incorporated by reference for all that it discloses. Another data transmission system that may also be adapted for use with the present invention is disclosed in U.S. Pat. No. 6,641,434 to Boyle, et al., which is also herein incorporated by reference for all that it discloses. In some embodiments, of the present invention alternative forms of telemetry may be used to communicate with the downhole components 36, such as telemetry systems that communicate through the drilling mud or through the earth. Such telemetry systems may use electromagnetic or acoustic waves. The alternative forms of telemetry may be the primary telemetry system for communication with the tool string 31 or they may be back-up systems designed to maintain some communication if the primary telemetry system fails. A data swivel 34 or a wireless top-hole data connection may facilitate the transfer of data between components 36 of the rotatable tool string 31 and the stationary surface equipment, such as a control module 33.

Preferably the downhole tool string 31 is a drill string. In other embodiments the downhole tool string 31 is part of a production well. In the present embodiment, an embodiment of a resistivity tool 35 in accordance with the present invention is shown producing a magnetic field 30 and projecting the magnetic field 30 through the formation 40.

Control equipment may be in communication with the downhole tool string components 36 through an electrically conductive medium. For example, a coaxial cable, wire, twisted pair of wires or combinations thereof may travel from the surface to at least one downhole tool string component. The medium may be in inductive or electrical communication with each other through couplers positioned so as to allow signal transmission across the connection of the downhole component and the tool string. The couplers may be disposed within recesses in either a primary or secondary shoulder of the connection or they may be disposed within inserts positioned within the bores of the drill bit assembly and the downhole tool string component. As the control equipment receives information indicating specific formation qualities, the control equipment may then change drilling parameters according to the data received to optimize drilling efficiency. Operation of the drill string 31 may include the ability to steer the direction of drilling based on the data.

Figure 2:
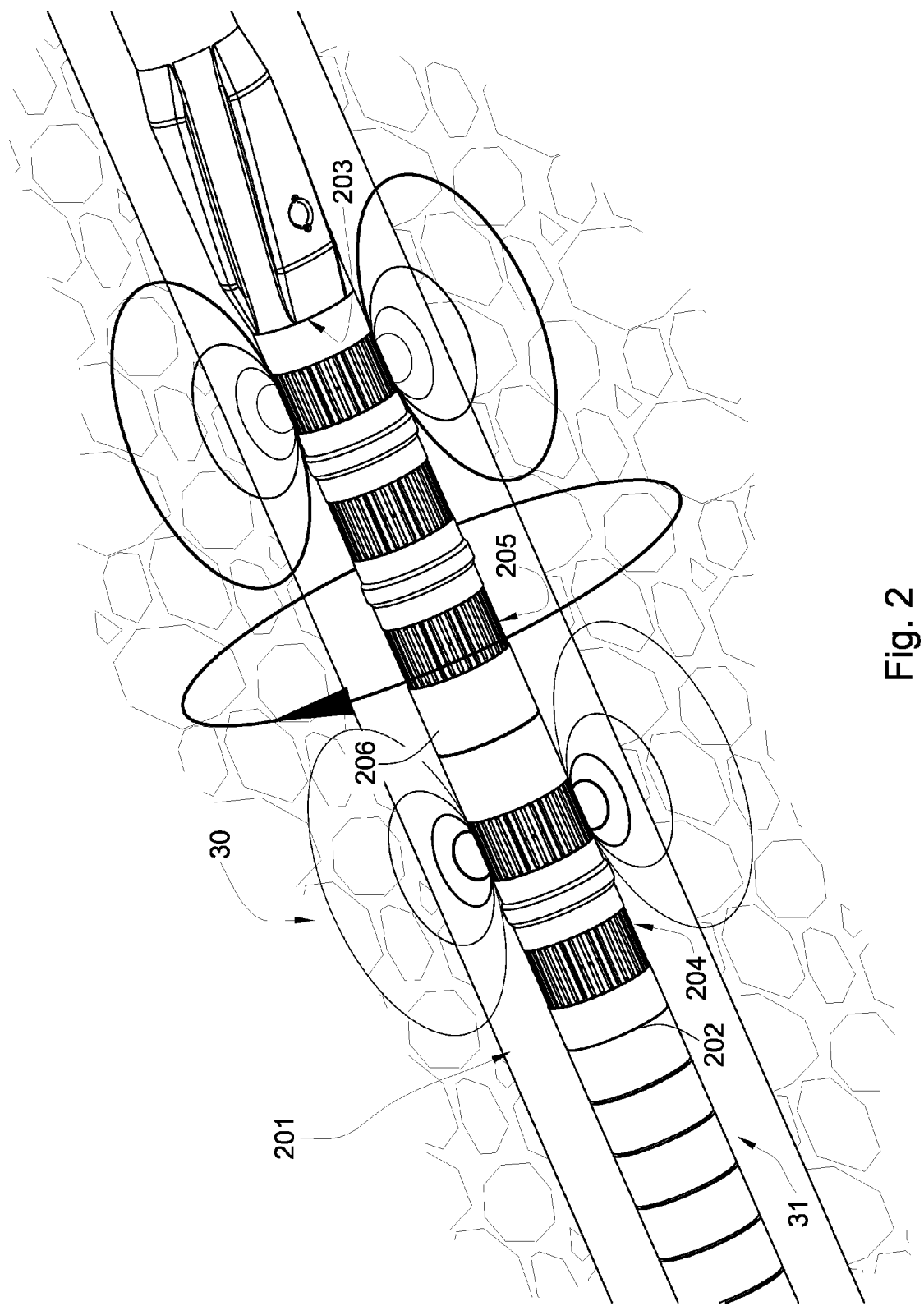
FIG. 2 is a perspective diagram of an embodiment of an inductive resistivity tool.

Referring now to FIG. 2 an embodiment of an inductive resistivity tool 201 is shown as part of a downhole drill string 31. The resistivity tool 201 is shown intermediate first and second tool joints 202, 203. A magnetic field 30 is shown being produced by two transmitting transceivers 204, and being received by three receiving transceivers 205. The magnetic field 30 is induced into the formation, which then in turn induces the receivers 205. By projecting the magnetic field through the formation and comparing the strength of the received signal to that of the transmitted signal, the resistivity of the formation may be determined. Because high resistivity is believed to have a correlation with a concentration of hydrocarbon and/or petroleum products in the formation, resistivity measurements may be used to determine the petroleum potential of a formation during the drilling process. A sleeve 206 may be disposed around the components of the resistivity tool 201 to protect them from mud and/or debris. Although specific numbers of receiving and transmitting transceivers 205, 204 have been shown in the present embodiment, any combination of any number of receiving and transmitting transceivers 205, 204 may be consistent with the present invention.

Figure 3:
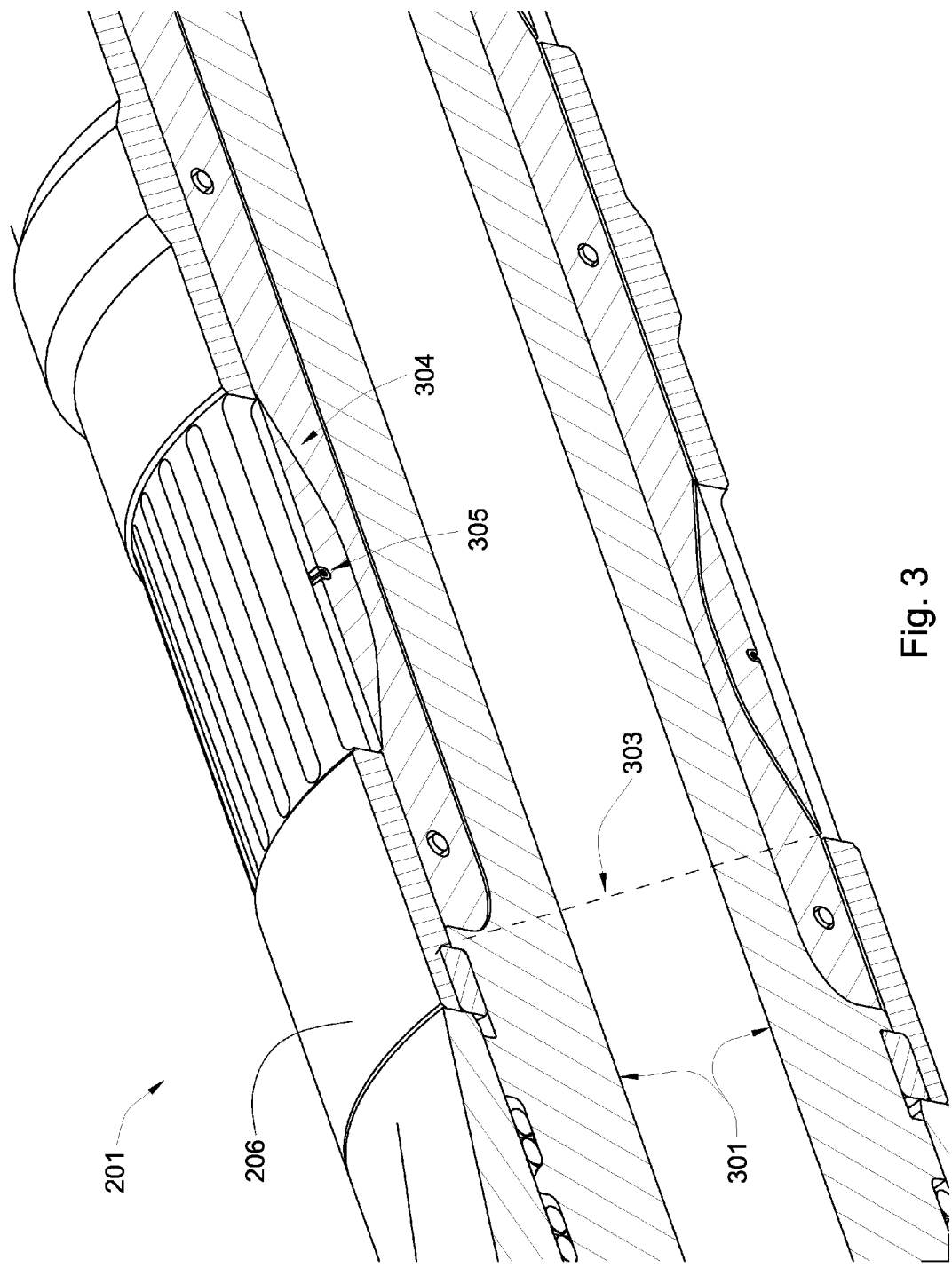
FIG. 3 is a cross-sectional diagram of an embodiment of a transceiver in an inductive resistivity tool.

Referring now to FIG. 3, a cross sectional view of an embodiment of a portion of a resistivity tool 201 is shown covered with a protective sleeve 206. The tool string component has a tubular wall 301 surrounding a central bore through which drilling mud may be transferred. The tubular wall 301 comprises an annular radial recess 304 formed in its outer diameter 303. A coil 305 is placed within the radial recess 304 and transceives induction signals outward from the tubular wall 301 when it is carrying an electrical current. As disclosed in FIG. 2, a plurality of radial recesses 304 may be disposed in the tubular wall 301, each recess 304 comprising at least one coil 305. In embodiments comprising a plurality of coils 305, each coil 305 may be selectively energized.

As drilling progresses deeper into the earth the drill string may pass through different formations which react with the different frequencies better than with others. Each coil has an inherent optimal frequency at which it resonates, which may or may not be ideal for the particular formation through which it is drilling. Thus it may be advantageous to change the optimal frequencies of the coils to be more compatible with the formation through which they are drilling.

Figure 4:
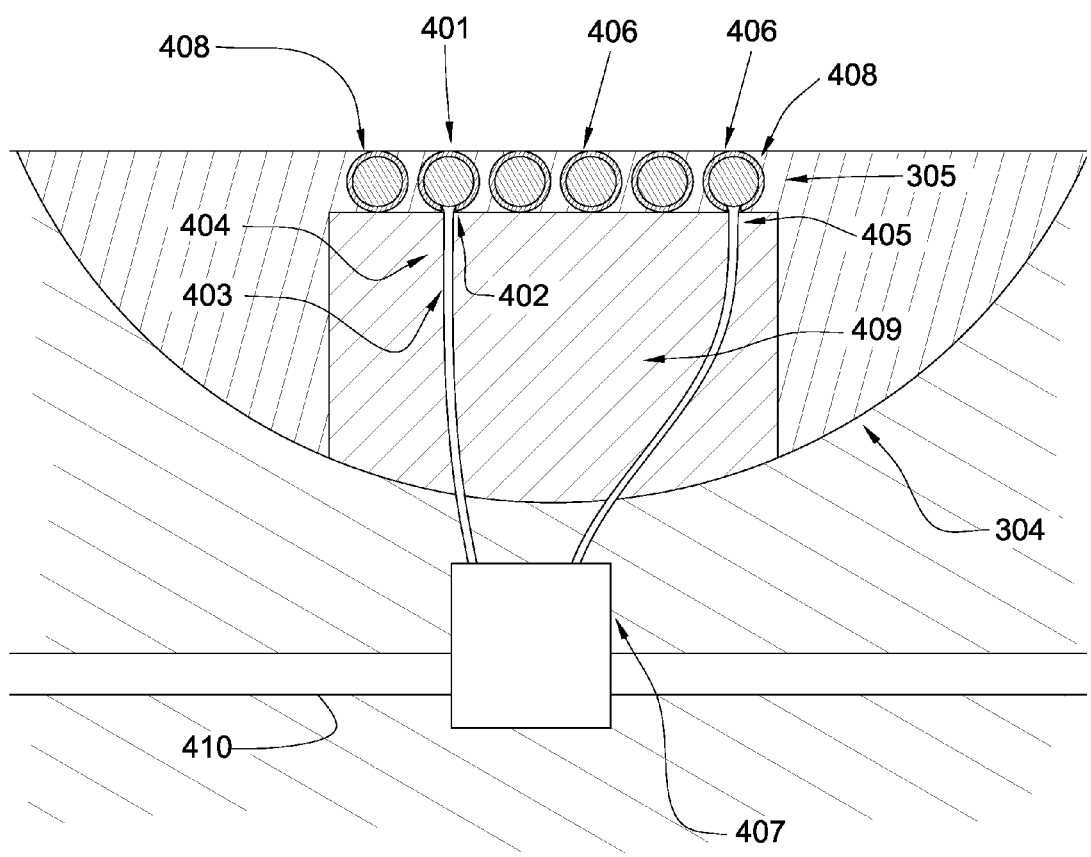
FIG. 4 is a cross-sectional diagram of an embodiment of a coil tap disposed in a radial recess

Now referring to FIG. 4, each coil 305 may be disposed immediately adjacent to at least one actuator 407, which may change the electrical characteristics of the coil (and thus the optimal frequency) by connecting and disconnecting an electrically conductive element to the coil. In some embodiments a plurality of actuators may be individually triggered. The trigger may result from a control signal sent from a control module (located downhole or at the surface). In some embodiments a single control signal may result in triggering two or more different actuators, each for a different coil 305, or in triggering one actuator that alters two or more different coils 305. A signal line 410 may supply power to the actuator 407 and/or may carry the control signal that may trigger the actuator 407.

The coils 305 may be disposed within a trough of ferrite or other magnetically conducting material which is believed to focus and amplify the power of the induced signal. In order to take advantage of the highly magnetically permeable materials such as ferrite while reducing the risk of cracking the brittle material, a flexible assembly of ferrite segments is formed in the shape of a ring. Flexible rings 802 may be advantageous for ease of production and assembly of the resistivity tool 201, as well as for durability in harsh downhole conditions.

In some embodiments of the invention the radial recess 304 may comprise at least two flexible rings tilted at different angles. The flexible ring may comprise a material selected from the group consisting of soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, an aerogel composite, polymers, organic materials, thermoset polymers, vinyl, a synthetic binder, thermoplastic polymers, an epoxy, natural rubber, fiberglass, carbon fiber composite, polyurethane, silicon, a fluorinated polymer, grease, polytetrafluoroethylene, a perfluroroalkoxy compound, resin, potting material, and combinations thereof.

Referring still to FIG. 4, a cross-sectional diagram of an embodiment of a coil 305 is shown disposed in a radial recess 304. Although six coil turns 406 are shown, any number of coil turns 406 may be used. In some embodiments a coil 305 may comprise between 1 and 15 coil turns 406. The coil 305 may comprise an electrically insulating coating 401 and the coating may comprise one or more openings 402 adapted to allow electrical contact between the coil 305 and an electrically conductive element. The coil tap 403 comprises a first wire 404 and a second wires 405. Each wire 404, 405 is connected to a different coil turn 408. The wires are connected to a switch, such as a rely or a solid state switch. When the switch is activated it is believed to create an electrical shortcut between the coil turns 408, thereby electrically bypassing any coil turns 406 between the two tapped turns 408. It is believed that by electrically bypassing the coil turns 406 intermediate the two tapped turns 408 that the effective inductance of the coil 305 is altered, thereby altering the optimal signal frequency of the coil. Open space around the coil 305, ring 802, and the radial recess 304 may be filled with a potting material 804. The potting material may comprise a material selected from the group consisting of polymers, organic materials, thermoset polymers, vinyl, an aerogel composite, a synthetic binder, thermoplastic polymers, an epoxy, natural rubber, fiberglass, carbon fiber composite, polyurethane, silicon, a fluorinated polymer, grease, polytetrafluoroethylene, a perfluroroalkoxy compound, resin, soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, and combinations thereof.

Figure 5:
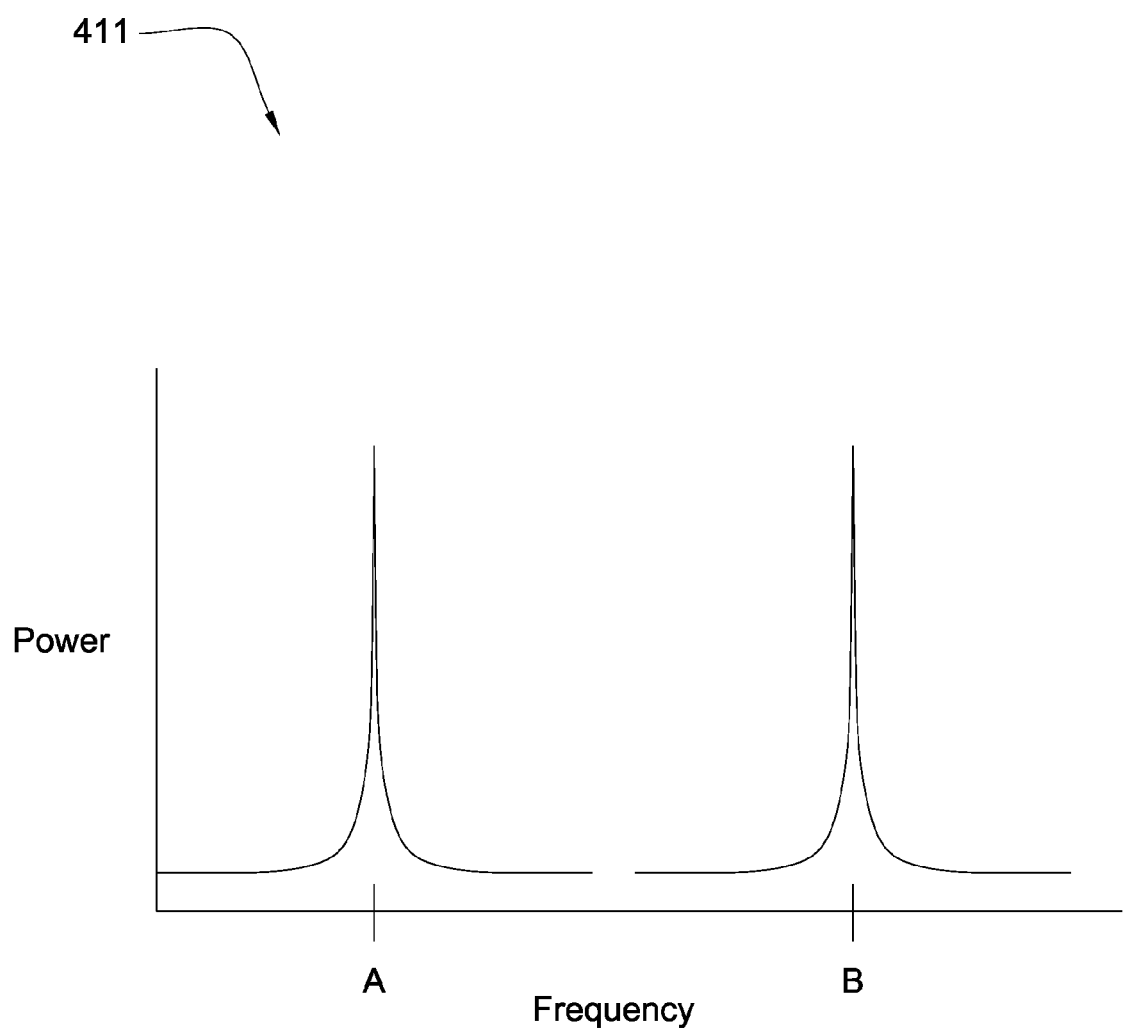
FIG. 5 is an embodiment of a graph of power verses frequency.

FIG. 5 discloses a graph 411 of power verses frequency for a single coil 305 which is shielded in a ferrite trough carrying electric current. The graph shows a coil which resonates optimally at a frequency A as well as showing the same coil resonating at a frequency B while a coil tap is applied. The frequency at which a power maximum occurs may also be referred to as the optimal signal frequency of the coil. It is believed that as the number of current carrying coil turns 406 in a coil 305 increases, that the optimal signal frequency of the coil decreases. A single coil 305 which may be manipulated may perform at multiple optimal signal frequencies. The desirable optimal signal frequency of the coil 305 may be selected by changing the number of current carrying coil turns 406 in the coil 305. Although the graph 411 shows two optimal signal frequencies, many other numbers of optimal signal frequencies are compatible with the current invention.

In some embodiments of the invention an electrically conductive element may comprise at least one conductive wire, electrically conductive stub, capacitor, inductor, resister, transformer, varicap diode, or combinations thereof. In some embodiments of the invention an actuator may comprise at least one spring, solenoid, transistor, capacitor, varicap diode, inductor, resister, bypass capacitor, decoupling capacitor, multiplexer, or combinations thereof. In embodiments of the invention wherein the actuator 407 comprises one or more switches, switches may be selected from the group consisting of physical switches, electrical switches, toggle switches, rocker switches, biased switches, trembler switches, pneumatic switches, reed switches, microswitches, centrifugal switches, Hall effect switches, and combinations thereof. In some embodiments of the invention a plurality of coils 305 may be disposed in the same radial recess 304.

Figure 6:
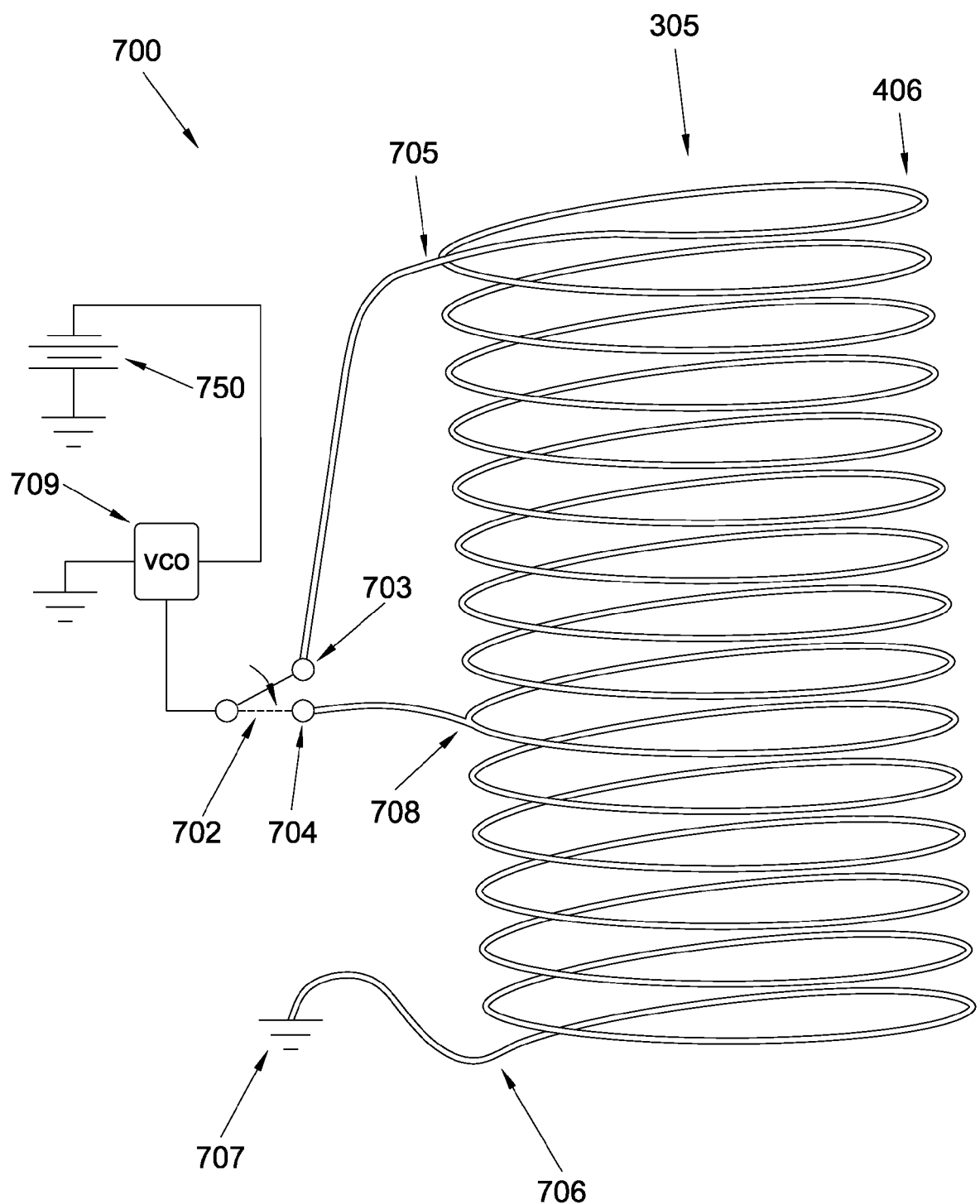
FIG. 6 is an electrical schematic of an embodiment of a switch controlling the connection between a power source and an embodiment of a coil.

Referring now to FIG. 6, an electrical schematic 700 depicts an embodiment of a coil 305 connected to a power source 701 by a switch 702. The depicted embodiment of a switch comprises a first position 703 and a second position 704. When the switch 702 is at its first position 703, current originating in the power source 701 travels through the switch 702 to a first end 705 of the coil. From the first end 705 the current travels through the coil turns 406 to the second end 706. From the second end 706 the current may travel to another component and/or to an electrical ground 707. When the switch 702 is at its second position 704 the current bypasses the first end 705 and enters the coil at an intermediate junction 708. From the intermediate junction the current may flow to the second end 706 through the remaining coil turns 406, and thence to another component and/or to the ground 707. Because the switch 702 in second position 704 breaks the electrical circuit between the first end 705 and the power source 701, a substantial amount of current are believed to bypass the coil turns 406 between the intermediate junction 708 and the first end 705 in favor of traveling directly to the second end 706 and towards the ground 707. By changing the switch 702 between first and second positions 703, 704 the number of coil turns 406 through which current travels is changed, thereby changing the optimal signal frequency of the coil. In some embodiments of the invention a signal alteration component 709 such as a voltage control oscillator (VCO) may be disposed between the power source 701 and the switch 702. In some embodiments, the VCO is permanently attached to the first end 705 of the coil and when the switch moves to the second position, the first portion of the coil may be bypassed to ground.

The signal alteration component 709 may allow for selection of specific characteristics of the electrical current that will travel through the coil 305. Signal alterations may tailor the current for the specified inductance of the coil 305. In some embodiments of the invention a single inductance value of a coil 305 may be compatible with multiple combinations of signal characteristics, and each combination of characteristics may be advantageous in specific applications and circumstances. A triggering signal may be sent to the switch 702 and thereby change the switch 702 between first and second positions 703, 704. The same or a different signal may result in the selection of signal characteristics by the signal alteration component 709.

Figure 7:
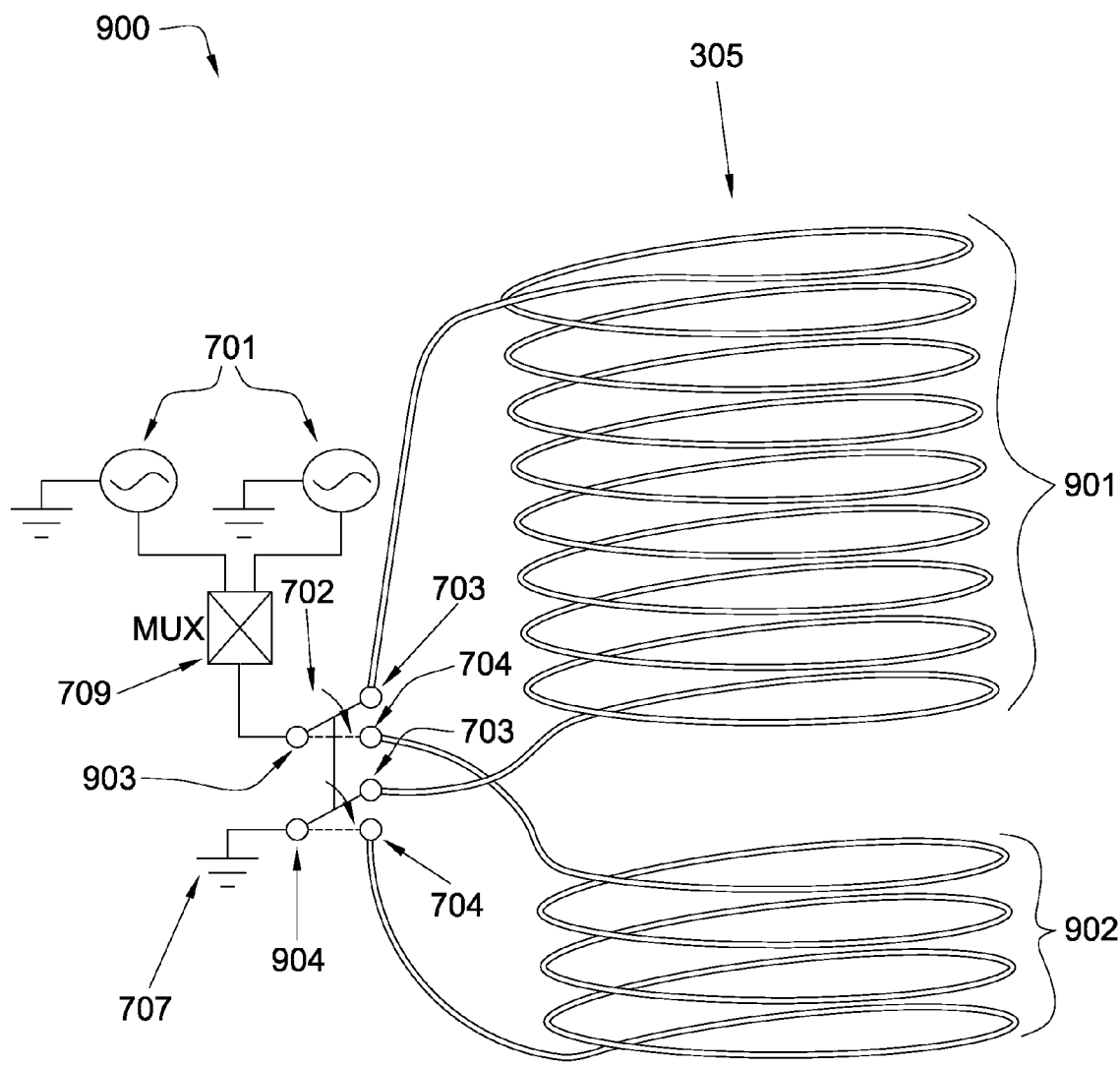
FIG. 7 is an electrical schematic of another embodiment of a switch controlling the connection between a power source and an embodiment of a coil comprising a plurality of coil turn sets.

Referring now to FIG. 7, an electrical schematic 900 of another embodiment of a coil 305 is disclosed in which the coil 305 comprises a plurality of coil turn sets 901, 902. In this embodiment first and second coil turn sets 901, 902 are connected to a plurality of AC signal sources 750 by the means of a switch 702. Although two AC signal sources 750 have been depicted, one or more AC signal sources 750 may be compatible with the present invention. In this embodiment the electrically conductive element comprises first and second switches 903, 904, which act concurrently with one another. When the switches 903, 904 are in first position 703, electrical current may travel through the first switch 903 to the first coil turn set 901 and thence towards the second switch 904 and to the ground 707. In such a situation the inductance and optimal signal frequency of the coil 305 is determined by only the inductance of the first coil turn set 901. When the switches 903, 904 are in second position 704, electrical current may travel through the first switch 903 to the second coil turn set 902 and thence towards the second switch 904 and to the ground 707. In this latter situation the inductance and optimal signal frequency of the coil 305 may be determined by the inductance of only the second coil turn set 902. In some embodiments of the invention both coil turn sets 901, 902 may be energized at once to obtain a third inductance and optimal signal frequency. Although two coil turn sets 901, 902 are shown in the present embodiment, any number of coil turn sets may be consistent with the present invention. An embodiment of a signal alteration component 709 is disclosed disposed between both AC signal sources 750 and both switches 903, 904. In this embodiment a multiplexer is disclosed as a signal alteration component 709. Although specific embodiments of signal alteration components 709 have been disclosed, other signal alteration components may be consistent with the present invention. In some embodiments, the coil turn sets 901 and 902 may be in the same trough or in different troughs.

Figure 8:
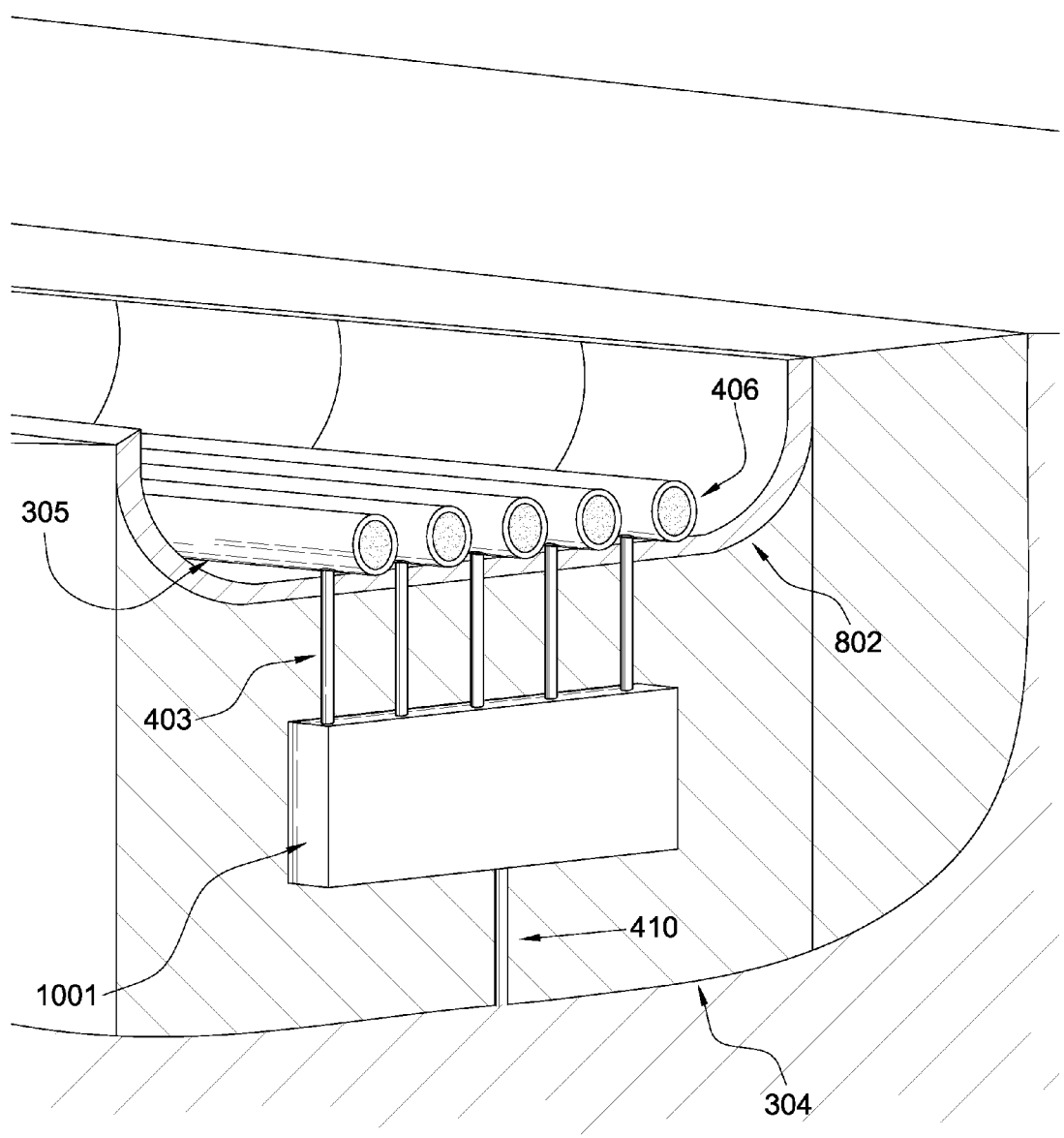
FIG. 8 is a perspective diagram of an embodiment of a switch box controlling the connection between a power source and an embodiment of a coil.

Referring now to FIG. 8 a perspective diagram discloses a coil 305 disposed in a flexible ring 802 inside a radial recess 304. In this embodiment a plurality of coil taps 403 are shown connected to a plurality of coil turns 406. Each coil tap 403 connects to at least one coil turn 406 and to a central switch box 1001. The central switch box 1001 comprises a plurality of switches 702 adapted to allow individual selection of which coil turns 406 to include and exclude from the electric current flow. A signal line 410 may trigger the selection of which circuits to open or close inside the switch box 1001, thereby selecting the number of coil turns 406 through which current may flow. This embodiment is believed to allow a great deal of flexibility in changing the optimal signal frequency of the coil 305.

Whereas the present invention has been described in particular relation to the drawings attached hereto, it should be understood that other and further modifications apart from those shown or suggested herein, may be made within the scope and spirit of the present invention.

What is claimed is:

1. An induction resistivity tool incorporated into a downhole tool string component, comprising:
   an annular radial recess disposed along an outside surface of a tubular wall of the downhole component;
   at least one electrically insulated induction coil disposed in the radial recess and adapted to transceive induction signals outward from the tubular wall when carrying an electrical current;
   the at least one coil being tuned for an optimal signal frequency; and
   an actuator in the downhole component which is adapted to put an electrically conductive element into and out of electrical communication with the at least one coil and thereby change the optimal signal frequency.

2. The induction resistivity tool of claim 1, wherein the electrically conductive element is a coil tap.

3. The induction resistivity tool of claim 1, wherein the electrically conductive element comprises at least one electrically conductive wire, electrically conductive stub, capacitor, inductor, resister, transformer, varicap diode, or combinations thereof.

4. The induction resistivity tool of claim 1, wherein the actuator comprises at least one motor, spring, solenoid, transistor, capacitor, varicap diode, inductor, resister, bypass capacitor, decoupling capacitor, multiplexer, or combinations thereof.

5. The induction resistivity tool of claim 1, wherein the actuator comprises a switch selected from the group consisting of physical switches, electrical switches, toggle switches, rocker switches, biased switches, trembler switches, pneumatic switches, reed switches, microswitches, centrifugal switches, Hall effect switches, and combinations thereof.

6. The induction resistivity tool of claim 1, wherein a plurality of actuators is disposed along the coil and each actuator is adapted to selectively electrically connect and disconnect an electrically conductive element with the coil.

7. The induction resistivity tool of claim 1, wherein at least two different electrically conductive elements are actuated by the same actuator.

8. The induction resistivity tool of claim 1, wherein the electrical contact of the electrically conductive element with the coil changes a potential electromagnetic circuit path through the coil.

9. The induction resistivity tool of claim 1, wherein the optimal signal frequency is adjusted by altering a number of coil turns carrying electrical current.

10. The induction resistivity tool of claim 1, wherein a flexible ring of magnetically conducting material is disposed intermediate the coil and a surface of the radial recess and is arranged within the radial recess such that it filters a range of frequencies of the induction signals.

11. The induction resistivity tool of claim 1, wherein the coil comprises between 1 and 15 turns of coil.

12. The induction resistivity tool of claim 1, wherein the resistivity tool is in communication with a downhole network.

13. The induction resistivity tool of claim 1, wherein the coil comprises an electrically insulating coating.

14. The induction resistivity tool of claim 13, wherein the electrically insulating coating comprises one or more openings adapted to allow electrical contact between the coil and the electrically conductive element.

15. The induction resistivity tool of claim 1, wherein the coil comprises two sets of coil turns, each set adapted to be selectively energized.

16. An induction resistivity tool incorporated into a downhole tool string component, comprising:
   a plurality of annular radial recess disposed along an outside surface of a tubular wall of the downhole component;
   at least one electrically insulated induction coil disposed in each radial recess and adapted to transceive induction signals when carrying an electrical current;
   each at least one coil being tuned for an optimal signal frequency; and
   an actuator in the downhole component which is adapted to put an electrically conductive element into and out of electrical contact with each at least one coil and thereby change their optimal signal frequency.

17. The induction resistivity tool of claim 16, wherein a plurality of the at least one coils in the same radial recess or in a plurality of radial recesses are each selectively energized.

18. The induction resistivity tool of claim 16, wherein at least two of the at least one coils are tuned to the same optimal signal frequency.

19. The induction resistivity tool of claim 16, wherein a plurality of the at least one coil in the plurality of radial recesses is each selectively operated at multiple frequencies and adapted to obtain resistivity data from multiple depths of the formation.

20. The induction resistivity tool of claim 16, wherein a control signal sent from a control module to the plurality of radial recesses triggers an actuator resulting in changing the optimal signal frequency for at least two coils.

* * * * *